United States Patent
Lai et al.

(10) Patent No.: US 11,853,685 B2
(45) Date of Patent: Dec. 26, 2023

(54) TRANSFORMATION OF RESOURCE FILES USING MAPPED KEYS FOR TRACKING CONTENT LOCATION

(71) Applicant: Oracle International Corporation, Redwood Shores, CA (US)

(72) Inventors: Tanghoi Lai, Foothill Ranch, CA (US); Aiman Copty, Belfast (GB); Toby Yu Chu Yip, Los Altos, CA (US); Yushui Du, Redwood City, CA (US); Huifeng Fan, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 193 days.

(21) Appl. No.: 16/627,947

(22) PCT Filed: Jan. 23, 2018

(86) PCT No.: PCT/CN2018/073741
§ 371 (c)(1),
(2) Date: Dec. 31, 2019

(87) PCT Pub. No.: WO2019/144259
PCT Pub. Date: Aug. 1, 2019

(65) Prior Publication Data
US 2020/0272785 A1    Aug. 27, 2020

(51) Int. Cl.
*G06F 40/00* (2020.01)
*G06F 40/151* (2020.01)
(Continued)

(52) U.S. Cl.
CPC ............ *G06F 40/151* (2020.01); *G06F 9/454* (2018.02); *G06F 16/986* (2019.01)

(58) Field of Classification Search
CPC ....... G06F 9/454; G06F 40/151; G06F 16/986
See application file for complete search history.

(56) References Cited

U.S. PATENT DOCUMENTS 6,964,014 B1 * 11/2005 Parish ................... G06F 16/958
715/255
8,452,814 B1 * 5/2013 Yin ....................... G06F 16/951
707/796
(Continued)

FOREIGN PATENT DOCUMENTS

CN          1252663       5/2000
CN        104516727       4/2015
(Continued)

OTHER PUBLICATIONS

Bos, Bert, "W3C Internationalization / Localization", Apr. 29, 1997, 2 pages https://www.w3.org/International/O-help-lang.html.*
(Continued)

*Primary Examiner* — Cesar B Paula
*Assistant Examiner* — David Faber
(74) *Attorney, Agent, or Firm* — Mughal Gaudry & Franklin PC (57) ABSTRACT

A content string can be identified from a resource file that defines one or more webpages of a web site. The content string can include particular content to be displayed in a webpage. The resource file can indicate a location associated with the particular content relative to other content to be displayed in the webpage. The webpage can be of the one or more webpages and associated with the content string. Key information for the content string can be identified. The key information can be unique relative to other key information associated with other content strings in the one or more resource files. A modified content string can be generated that includes the content, identifier of the resource file, and key information. The one or more resource files can be updated to include the modified content string. The one or more resource files can be transmitted to a receiving device.

20 Claims, 7 Drawing Sheets

(51) Int. Cl.
*G06F 9/451* (2018.01)
*G06F 16/958* (2019.01)

(56) References Cited

U.S. PATENT DOCUMENTS

| | | | |
|---|---|---|---|
| 10,146,514 B1* | 12/2018 | Joyce | G06F 3/0481 |
| 2006/0047499 A1 | 3/2006 | Chen et al. | |
| 2011/0258532 A1* | 10/2011 | Ceze | G06F 16/9574 |
| | | | 715/234 |
| 2014/0372400 A1* | 12/2014 | Ramachandran | G06F 16/951 |
| | | | 707/706 |
| 2015/0012809 A1 | 1/2015 | Kaushik et al. | |
| 2015/0324336 A1* | 11/2015 | Glezos | G06F 40/58 |
| | | | 715/234 |
| 2018/0081646 A1* | 3/2018 | Bugrov | G06F 9/454 |

FOREIGN PATENT DOCUMENTS

| | | |
|---|---|---|
| CN | 105103148 | 11/2015 |
| CN | 105404508 | 3/2016 |
| CN | 107357568 | 11/2017 |

OTHER PUBLICATIONS

HTMLQuick, "Blockquote Element", 9 pages, Feb. 6, 2017 https://web.archive.org/web/20170206145641/https://www.htmlquick.com/reference/tags/blockquote.html.*

International Application No. PCT/CN2018/073741, International Search Report and Written Opinion dated Oct. 23, 2018, 9 pages.

* cited by examiner

FIG. 1

Application GUI

| Key | Value | Release | File | Language | Screenshot |
|---|---|---|---|---|---|
| 1385200841597_opcHtmlText.1F13Le | Release Readiness | 16.1 | cloudocom/OPCHOME/O PCAPPLICATIONS/ OPCS AASEPM/ OPCSAASPB/ 1385200841597.xml | en_US | Screenshot link |
| 1385183473l78_opcHtmlText.2O155k | Leverage business drivers, allocation methods, and metadata that are standardized for consistent usage across all models | 16.1 | cloudocom/ OPCHOME/O PCAPPLICATIONS/ OPCS AASEPM/ OPCSAASPROF COSTMGMT/138518347 1928.xml | en_US | Screenshot link |
| 1385183472667 opcHtmlText.3hgGJU | Controlled and Transparent | 16.1 | ccloudocom/ OPCHOME/O PCAPPLICATIONS/ OPCS AASEPM/ OPCSAASPROF COSTMGMT/138518347 1928.xml | en_US | Screenshot link |
| 1385183473671_opcHtmlText.3b482w | Access prebuilt analytics for difficult queries such as "profit curves" that reveal hidden drags on profitability | 16.1 | cloudocom/ OPCHOME/O PCAPPLICATIONS/ OPCS AASEPM/ OPCSAASPROF COSTMGMT/138518347 1928.xml | en_US | Screenshot link |
| 1385183474289_opcHtmlText.2GB3mu | Integration | 16.1 | cloudocom/ OPCHOME/O PCAPPLICATIONS/ OPCS AASEPM/ OPCSAASPROF COSTMGMT/138518347 1928.xml | en_US | Screenshot link |

TRANSFORMATION OF RESOURCE FILES USING MAPPED KEYS FOR TRACKING CONTENT LOCATION

CROSS-REFERENCES TO RELATED APPLICATIONS

This application is a U.S. National Stage of International Application No. PCT/CN2018/073741, filed Jan. 23, 2018, entitled "TRANSFORMATION OF RESOURCE FILES USING MAPPED KEYS FOR TRACKING CONTENT LOCATION," the entire disclosure of which is incorporated herein by reference for all purposes.

FIELD

Embodiments relate to generating mappings between portions of screenshots and object models using strings. Specifically, each string includes a key representing a specific position and further includes a definition of content, such that the string is indicative of both the content and a context of the content.

BACKGROUND

While webpages are initially generated in a particular human language, it is often desirable to avail other versions of the webpages in other languages, such that a large group of users can understand the content. Specifically, a preferred language can be detected for a given user (e.g., based on a browser setting), and a corresponding version of the webpage can be transmitted to the device. To generate the another version of a webpage, content can be extracted from an initially generated webpage, a translation for the content can be identified, and the version can be generated using the translation. However, frequently webpage content is distributed across multiple objects and/or frames. While portions of the content can be individually translated, such isolated translation then fails to capture a webpage context of the content. A context (e.g., surrounding words or images and format of the content) may be particularly important when particular content is associated with multiple potential translations. Thus, it would be desirable to process webpages to facilitate context-sensitive translation.

SUMMARY

In some embodiments, methods and systems are provided for modifying content strings based on key information. One or more resource files that define one or more webpages of a web site can be accessed. A content string can be identified from a resource file of the one or more resource files. The content string can include particular content to be displayed in a webpage. The one or more resource files can indicate a location associated with the particular content relative to other content to be displayed in the webpage. The webpage can be of the one or more webpages and associated with the content string. Key information for the content string can be identified. The key information can be unique relative to other key information associated with other content strings in the one or more resource files. A modified content string can be generated that includes the content, identifier of the resource file, and the key information. The one or more resource files can be updated to include the modified content string. The one or more resource files can be transmitted to a receiving device.

BRIEF DESCRIPTION OF THE DRAWINGS

Illustrative embodiments of the present invention are described in detail below with reference to the following drawing figures.

DESCRIPTION

Some embodiments of the invention provide an approach to automatically construct a log categorizer. Instead of requiring a person to manually assess the contents of the log parser, the log contents themselves are used to construct the categorizer. Other additional objects, features, and advantages of the invention are described in the detailed description, figures, and claims.

In some embodiments, techniques are provided for facilitating translation of a webpage from a first language to a second language. Specifically, one or more resource files that define an original webpage is received that includes content in the first language. The original webpage can include a set of elements, such as one or more buttons, table elements, paragraphs (or parts thereof), sentences (or parts thereof), headings, etc. Each element can be defined by a string in a resource file, which identifies content of the element.

During a build process (at a developer device), the string can be modified to produce a corresponding pseudo string by embedding data that is indicative of a location of the element in the original webpage and/or data identifying the resource file. The data indicative of a location of the element can include a string key, which is mapped to (for example) a position in a screen shot of a webpage and/or a position in a document object model of a webpage. For example, a source code for a webpage can include a string that includes a key-value pair, where the value includes particular content. The key may be included within or may be a class name. The value may include text defined to be an element of the class with the class name. To illustrate, a source code may include: <h2 class="state">California</h2>, in which case "state" is the key, and "California" is the value.

The source code can indicate a location for the content based on where, within the source code, the string is located. To illustrate, if the string is included between table tags (between <table> and </table>), the webpage is configured to have the content presented within the table. The source code can further indicate a position of the table relative to one or more other elements in the webpage. When a modified string includes the key, the string with the key-value pair can be located within the source file.

Processing the source code can then indicate where, within a rendered webpage, the content is to appear and/or where, within a document object model, the content is to appear (e.g., in a first row of a table that is within a top left frame). In some instances, the source code is processed to generate a rendered version of the webpage and/or a document object model of the webpage, such that the position of the component (as identified by locating the corresponding key) within the webpage or document object model can be visually represented.

Thus, each string within source code that defines a unique key can be associated with a particular location (e.g., where content of the string is to be rendered in a webpage or within a document object model for the page). At run time (at a translation input device having received one or more files with the modified strings), a browser plugin can convert each pseudo string back to the original string form and can insert the file identification and key information as HTML attributes. The source code with the converted strings can then be processed to render a screen shot of the original webpage. The plug-in can further detect each pseudo string and/or converted string (by detecting a particular character string) as including content to be translated and identify the content of the string(s) to indicate that translation is requested. For example, a separate window within an interface may identify content from each of the strings and include an input field to receive translated text. Thus, use of the plug-in at the translation input device can allow a first application (used to define content translations) to present a same screen shot of a webpage that is to be presented using a second application (a browser operating without the plug-in and accessing the webpage) at a user device.

The first application, however, includes additional data in the interface, such as one or more elements to identify particular content to be translated, one or more elements to receive translation text, one or more elements to identify a document object model for a webpage (e.g., and a position within the model of content to be translated) and/or one or more elements to indicate a particular position within a screen shot at which content to be translated is positioned). For example, at the translation input device, an interaction with content from a given string (e.g., by clicking on it) may cause the screen shot to be updated to indicate a position of the content (e.g., by superimposing an arrow pointing to the content or by superimposing a shape surrounding the content). The position can be identified using the HTML attribute of the string that identifies a key associated with the string, such that the content can be identified within the source code even if the content itself is included multiple times on a webpage (by associating each instance of the content with a different key).

A translation for the specific content can be identified (e.g., via receipt of a communication from a translation input device that identifies the translation) in view of the specific content and a context associated with the position. A new version of the string can then be generated that includes the translation and is associated with a second language. In some instances, the screen shot is modified (or a new screen shot is generated and presented) to include the translated context at the associated position.

Thus, before and/or after a translation for particular content is identified, processing of resource-file strings facilitates tracking of the location of the content. By using content-specific strings, tracking can persist even in complex instances, such as when the content is dynamic and potentially retrieved from a first resource file to be included (at the tracked location) in a second resource file. Further, the tracking is automated and does not require, for example, manual upload of screenshots and/or manual identification of location of particular content. This tracking facilitates identifying a webpage context for the content and promotes accurate translation of the content.

Figure 1:
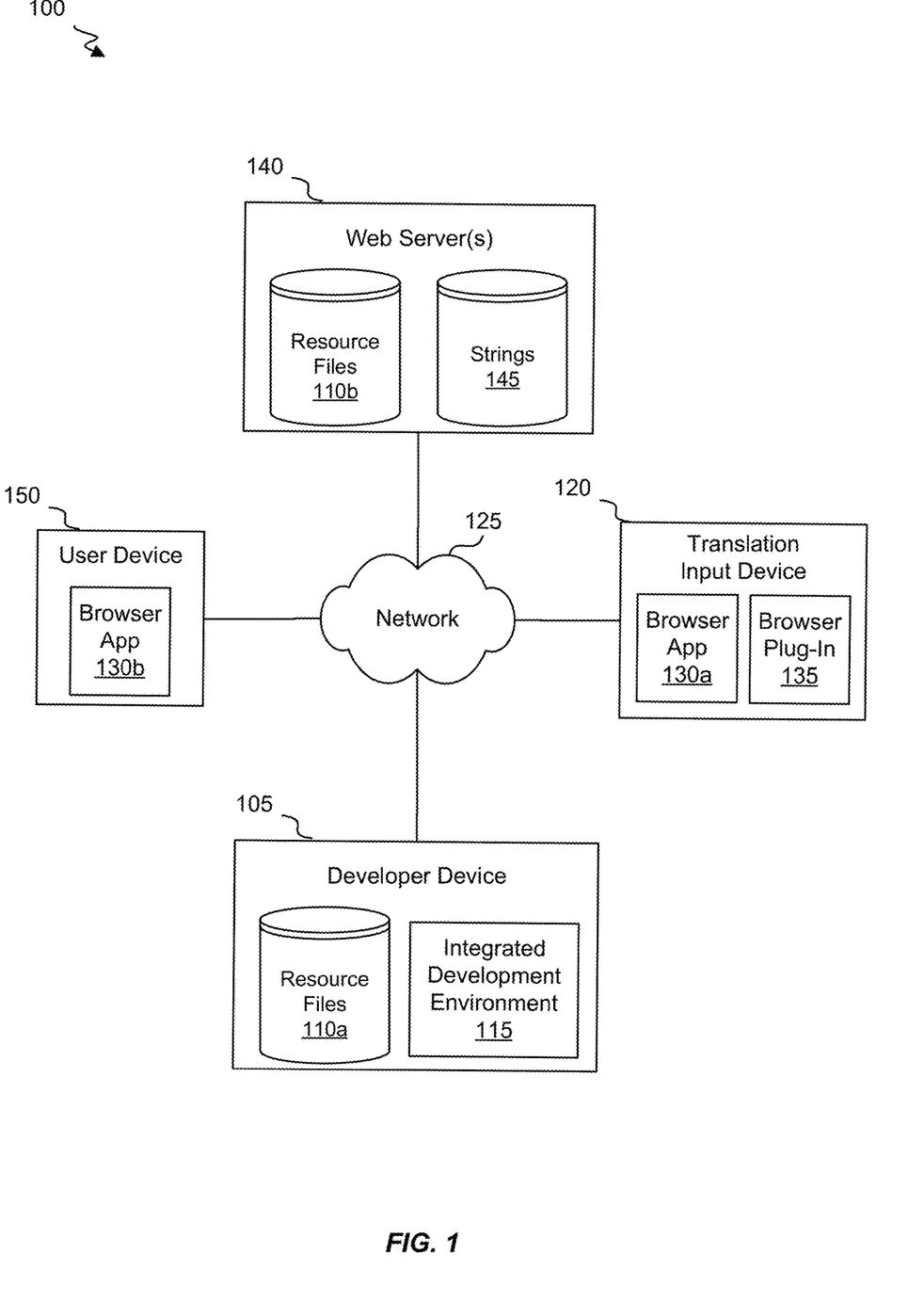
FIG. 1 shows an example of an interaction system for providing translated webpages.

FIG. 1 shows an example of an interaction system 100 for providing translated webpages. Interaction system includes a developer device 105, which generates code (e.g., HTML code and/or script(s)) to define one or more webpages of a web site or domain. The code can include one or more resource files, each of which may define content for a part of a webpage of the one or more webpages. The resource file(s) can be stored at a local and/or remote resource file data store 110a. Developer device 105 may generate each resource file in response to receiving one or more inputs via a graphical user interface of the device, such as input that includes the content. The input may also be associated with a particular content object at which the content is to be displayed. The input may be received while interacting with an integrated development environment 115 executing at developer device 105. Integrated development environment 115 can, for example, provide an interface that facilitates editing source code, performing build operations, and/or debugging.

Each resource file may correspond to, for example, one or more particular data objects, such as a button, heading, text block, title, menu option, paragraph and/or sentence. For example, a resource file can include one or more localizable and/or translatable strings, each of which can correspond to a data object. Each string can include a key-value pair, where the key identifies the data object and the value identifies content for the data object. Each localizable and/or translatable string can be configured to be associated with multiple versions of particular content—each being associated with a different written and/or spoken language. An initial version of the string can include content in a language used by a developer using developer device 105.

The resource file(s) can be configured such that, during rendering, each localizable string is passed to a string-loading routine. If the routine includes an identifier matching a key for the string, content for the value can be included in a displayed data object. The content selected for display can be from a version associated with a particular language corresponding to user-device data (e.g., a selected language for a browser executing at a user device).

In some instances, content associated with at least some versions of a string are identified at a different device other than developer device 105. For example, developer device 105 may generate original versions of multiple strings to be associated with various fields and buttons in a web form and may transmit the original versions of the strings to another device, such that translated content can be identified for each string. However, it can be informative to provide additional information to indicate a context of the content in the original strings. Developer device 105 may define strings, not in isolation, but in association with particular portions of a webpage. For example, input received at developer device 105 (e.g., via a graphical user interface) may indicate that content for a given string is to be associated with a particular data object that is to be associated with a particular (e.g., relative or absolute) position within a webpage. The particular position may be adjacent to and/or near other content (e.g., hard-coded content or content in one or more other data objects) that and/or that may be informative as to an appropriate translation.

Thus, in some instances, a string is modified to include additional data that can be used to identify contextual data (e.g., surrounding text and/or graphics) that may facilitate translation of context of the string. The modification may occur within integrated development environment 115 and/ or using another software application (e.g., executing at developer device 105 or at a remote location, such as at a web server). The modification can include embedding or adding additional data into the string, such as embedding or adding additional data into a value of a key-value pair of the string. The additional data can be configured to be indicative of where content of the string is to be presented in a rendered webpage. The additional data can include, for example, an identification of a particular resource file, an identification of a particular webpage, an identification of a key of the key-value pair of the string, an identification of a particular data object in a webpage, and/or an identification of a position within a webpage. The modified string may further be configured to indicate that the string has been modified, such as by including a particular character or character string at one or more locations of the string (e.g., at a beginning and/or end of the string).

Interaction system 100 can include a translation input device 120 that identifies various versions of particular content associated with various strings. Translation input device 120 can receive one or more modified strings and/or one or more associated resource files over a network 125 (e.g., from developer device 105 or from an intermediate device, such as a web server). Network 125 can include, for example, the Internet, a local area network, a wide area network, etc.

A browser application 130a and a browser plug-in 135 can be installed at translation input device 120. Browser plug-in 135 can be configured to present an interface that displays data corresponding to one or more strings associated with a resource file, receive input (e.g., from a translator user) that identifies translated content, and generate one or more translated versions of each of the one or more strings.

Further, browser plug-in 135 can detect that a received string is in a modified format that includes context-relevant data (e.g., a file name and key in a value). Browser plug-in 135 can then process the modified string to extract the context-relevant data, such that (for example) the modified string is transformed to include an original key-value pair. One or more HTML attributes can be generated and associated with the transformed string. Thus, for example, the string can include a first HTML attribute that identifies a resource file and a second HTML attribute that identifies a key and/or data object (e.g., that includes a key that is associated with a single data object).

Browser plug-in can be configured to generate a presentation (to be displayed in a browser) that includes multiple portions. A first portion can identify at least part of a string, such as content from an original version of the string. Further, the first portion can be configured to receive input that identifies translated content to be included in another version of the string (associated with another language). A second portion can include a display of a webpage associated with a resource file identified in an HTML attribute of the string. An indication as to which portion of the webpage corresponds to the string can also be provided (e.g., via an arrow, boxed region, etc.). The portion can correspond to a position associated with the key. Thus, a translator user can see the original content associated with the string in a context of other surrounding context.

Translation input device can receive, at the first portion, the translated content, and can generate a new version of the string that includes the translated content. The new version may be associated with an identification of a particular language. In some instances, browser plug-in 135 can update the presentation to include translated content for one, more or all strings (e.g., as new versions of strings are generated, upon request or at predefined times).

Translation input device 120 can transmit the new versions of the strings over (a same or different) network 125 to a web server 140 (e.g., directly or via one or more intermediate devices, such as via developer device 105). Web server 140 can store resource files received from developer device 105 in a resource file data store 110b and versions of strings in a string data store 145. One or more resource files and one or more scripts may be associated with a particular domain, web site and/or webpage.

Web server 140 may receive a request over (a same or different) network 125 from a user device 150 for a particular web page (e.g., associated with a particular web site and domain). The request may have been generated by a browser app 130b executing at user device 150. The request may include an identification of a language. In response to receiving the request, web server 140 can identify one or more resource files responsive to the request. In some instances, web server 140 also identifies one or more versions of strings that correspond to the resource file(s) and that further correspond to the identified language. The resource file(s) and identified versions of strings can then be transmitted to user device 150. In some instances, web serve transmits the resource file(s) and a set of versions (e.g., corresponding to a set of languages) that are associated with the resource file(s).

User device 150 can process the resource file(s) to render a corresponding webpage. The execution may include identifying a key for a string that is to be retrieved, such that content from the string can be included in the webpage. In instances where multiple versions of individual strings are received at user device 150, a version that matches a particular language (e.g., identified in browser settings) can be retrieved.

Figure 2:
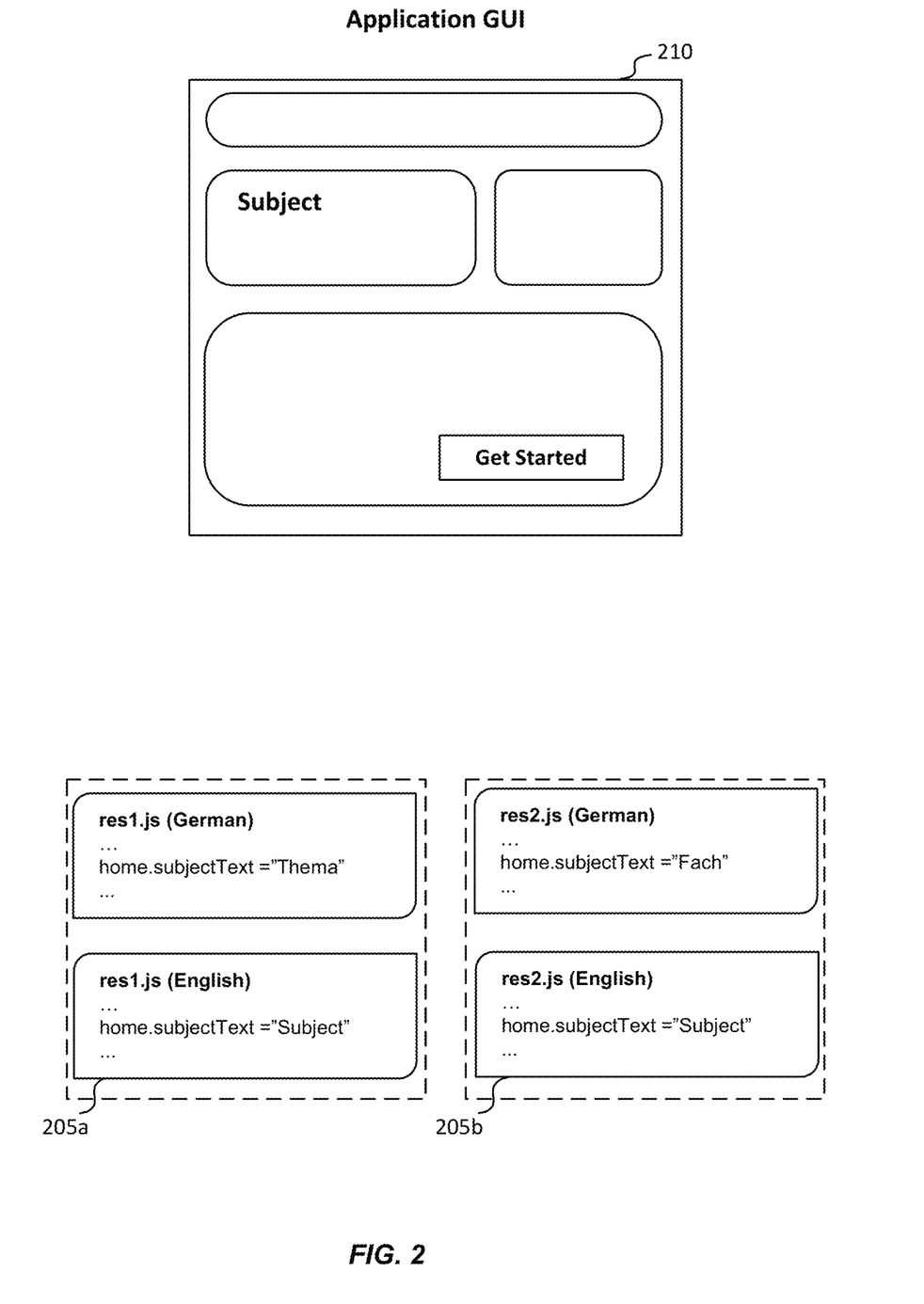
FIG. 2 illustrates an example of an application graphical user interface and two potentially associated resource files.

To illustrate how embedding file and key information in a string can improve translation quality, an illustration is provided in FIG. 2. In this example, a translation input device receives a resource file and is to identify translated content for a various English-version strings 205a, 205b. In the depicted instance, a first string 205a includes a content value of "Subject" and pertains to a home object, and a second string 205b includes a content value of "Subject" and pertains to an order object. The context of the two objects indicates that "subject" would translate to two different words in German: "Thema" in reference to the home object and "Fach" in reference to the order object. However, without an identifying this context, a translator user may find it difficult or impossible to identify the appropriate translation.

Even if an application graphical user interface (GUI) is provided that shows a position of "Subject", it may remain difficult to determine to which of the English-version strings the depicted instance pertains.

Figure 3:
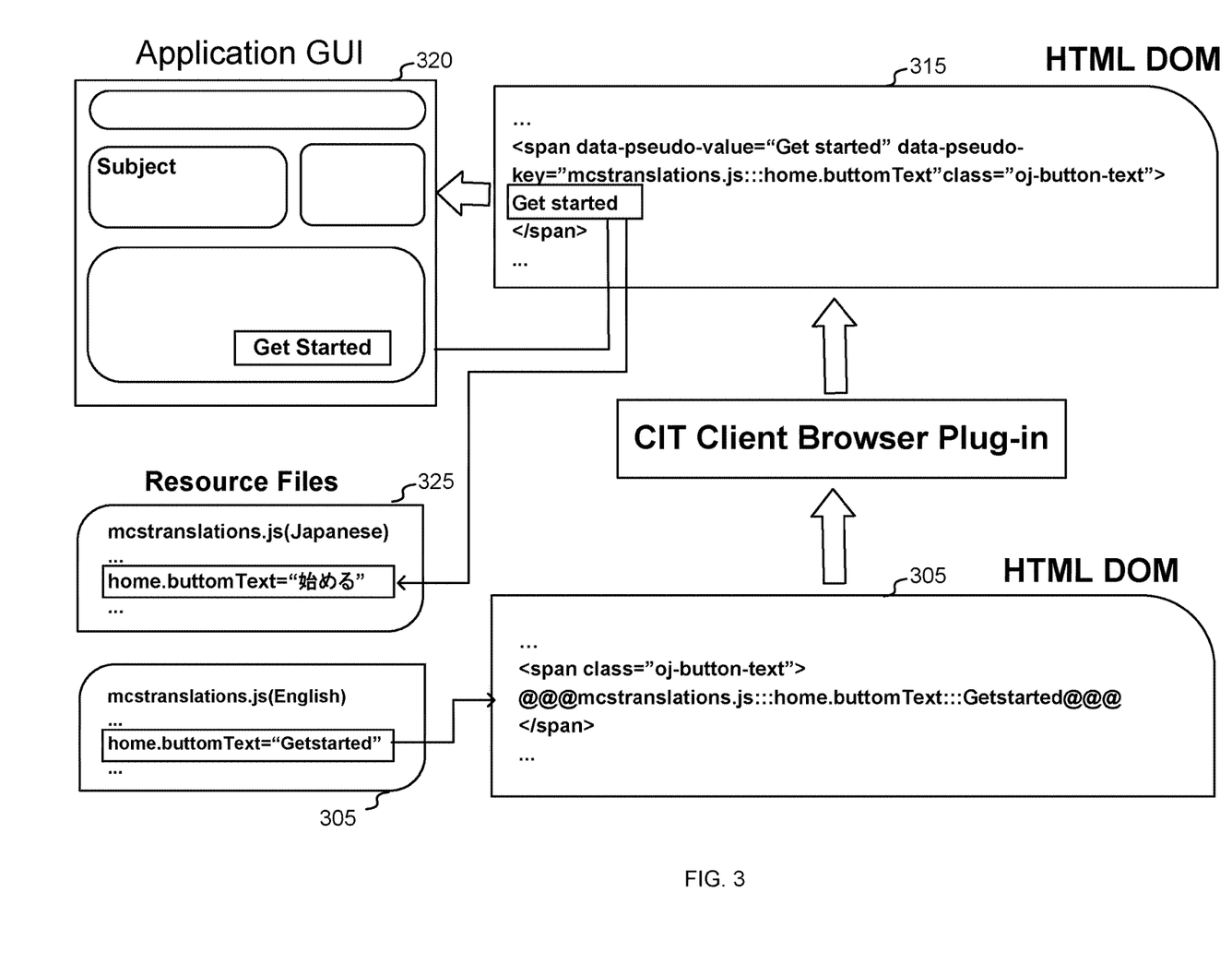
FIG. 3 provides an illustration of transforming resource-file strings to facilitate location-based tracking of content.

FIG. 3 provides an illustration of transforming resource-file strings to facilitate location-based tracking of content. In this instance, a modified string 305 received at the translation input device includes an identification of a resource file and a key, such that it can be mapped to a particular display position. The modified string can include one generated based on an original string 310 in a first language. For example, original string 310 may have been generated and/or defined at a developer device and further modified locally at the developer device or remotely.

A plug-in installed at the translation input device can detect that modified string 305 is to be transformed due to the inclusion of a particular character string "@@@" in the string. The plug-in then extracts the file name "mcstranslations.js" and key identifier "oj-button-text". The plug-in then generates a transformed string 315 that includes the extracted values of HTML attributes.

One or more resource files can be processed to render an interface 320 that includes (or that is) the identified file. Thus, a translator user can identify a context for the content to be translated. The translation input device can receive translated content for the string, such as a translation of "Get Started" into Japanese. The translated content can be used to generate a translated version 325 of the string.

Figure 4:
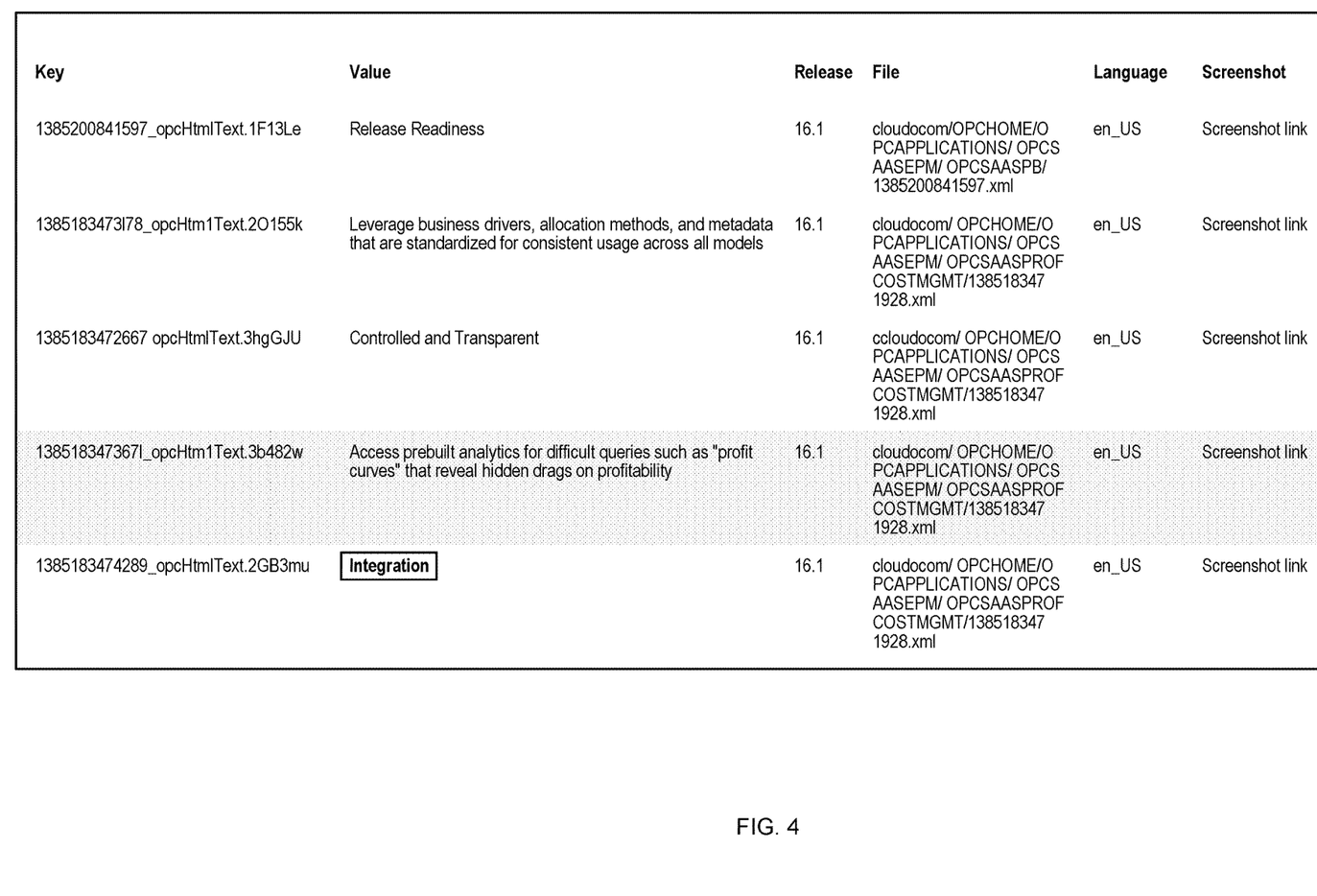
FIG. 4 shows an example of an interface displaying modified string information.

FIG. 4 shows an example of an interface 400 displaying modified string information. Interface 400 can be presented at a translation input device. Interface 400 includes data corresponding to each of five modified strings. In some instances, translated content is being requested for each of the five modified strings. The interface includes, for each of the modified strings, a key that corresponds to a particular data object in a webpage, a value that identifies content in English for the data object, and a file identifier identifying a file that defines the data object. Further, each modified-string data element (row in the table) includes an option to view a screen shot of a webpage in which the data object is presented.

Figure 5:
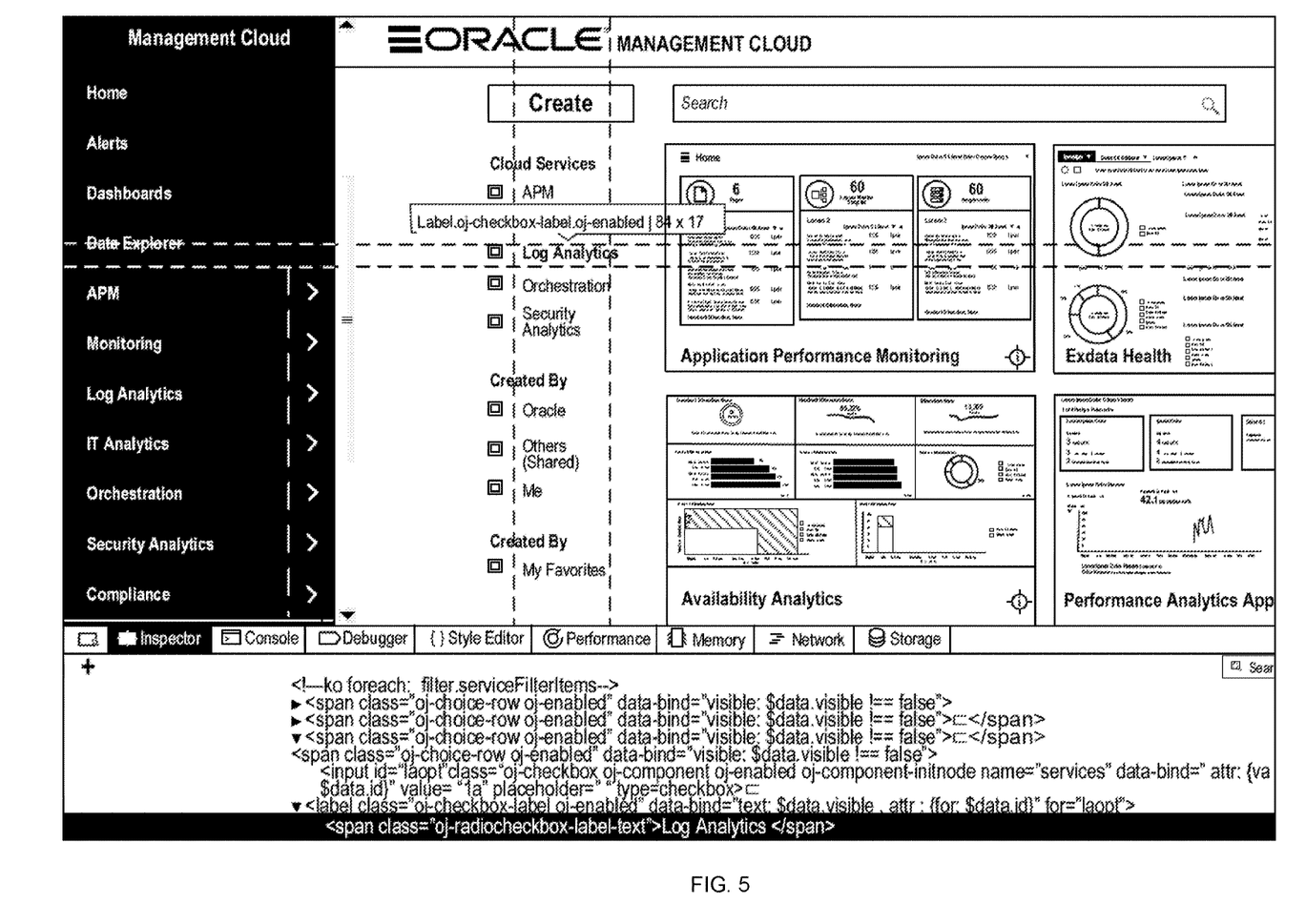
FIG. 5 shows an example of an interface that includes associated content, strings and screen shots.

FIG. 5 shows an example of an interface that includes associated content, strings and screen shots. For example, the depicted interface may be presented at a translation input device. A top portion of the interface includes a screen shot generated based on one or more webpages associated with a webpage. The screen shot can be generated automatically using the resource file(s) without needing a user device to have actually requested, previously presented or captured the displayed data.

A bottom portion of the interface includes strings associated with various portions of the displayed screen shot. Selecting a given string (e.g., by clicking on it) can cause a part of the displayed screen shot to be identified, with the part corresponding to the selected string. For example, in the depicted instance, the selected string includes a checkbox data object associated with "Log Analytics" as content. In response to the selection, the content displayed in the screen shot is highlighted, dashed lines surround the content, and a pop-up window appears that identifies data associated with the data object. Thus, a context for "Log Analytics" is apparent and can be used to inform a translation determination.

Figure 6:
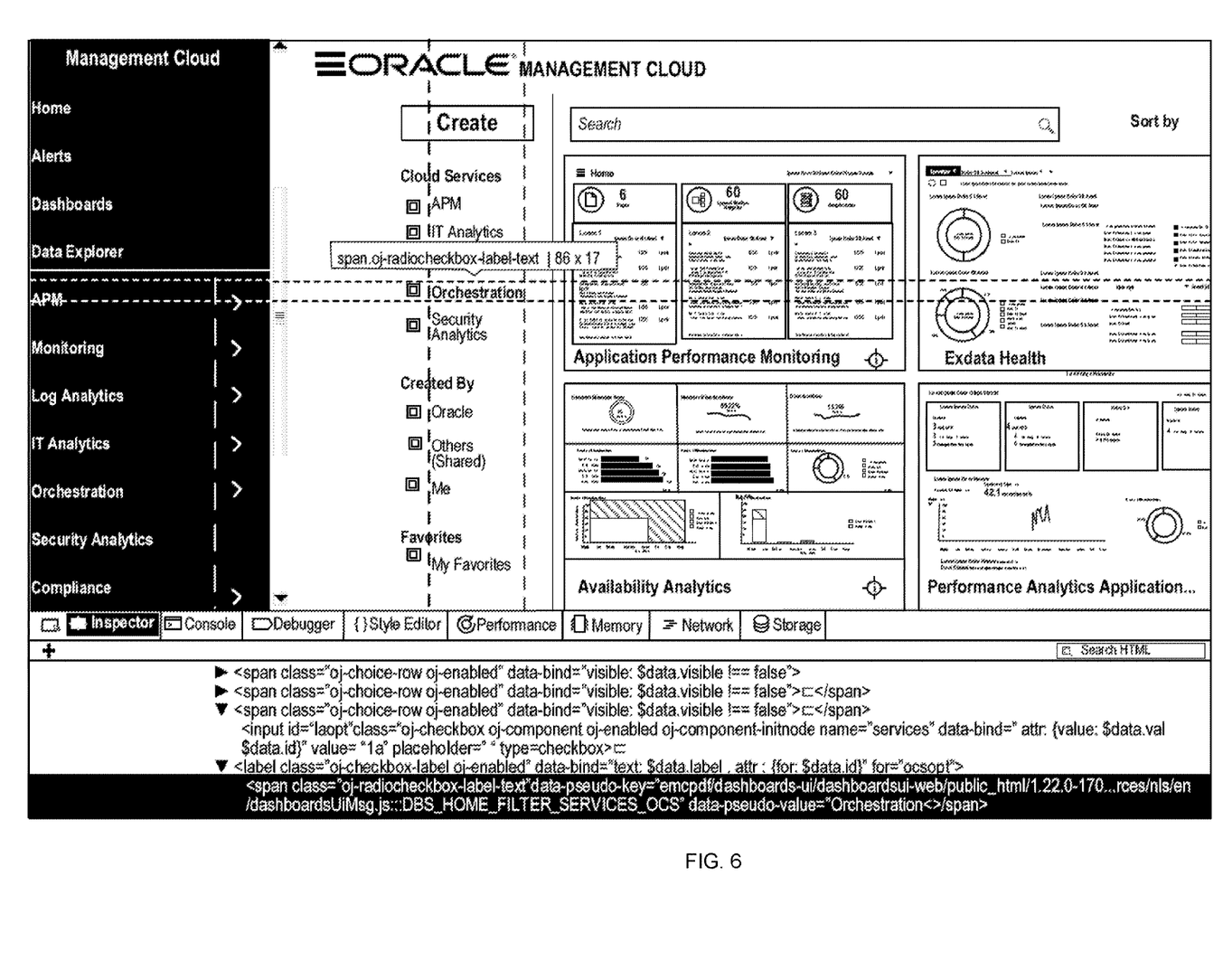
FIG. 6 shows an example of an interface that includes associated content, strings and screen shots.

FIG. 6 shows an example of an interface that includes associated content, strings and screen shots. The interface in FIG. 6 is similar to FIG. 5. However, a string corresponding to "Orchestration" content is selected. Further, the string presented in the bottom portion includes a transformed string that includes the HTML attributes identifying a file and key associated with the string.

Figure 7:
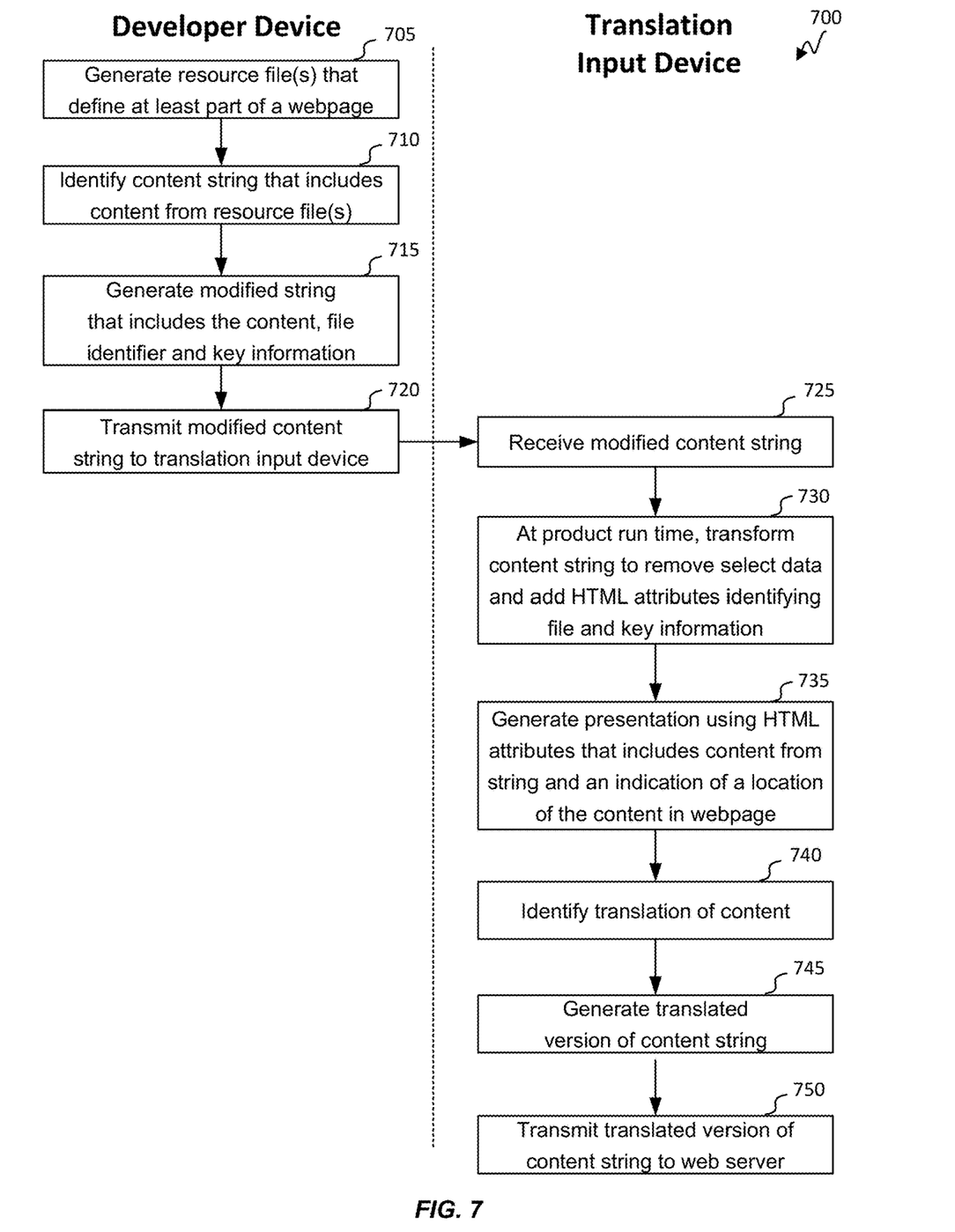
FIG. 7 shows a process for providing translated webpages in accordance with some embodiments.

FIG. 7 shows a process for providing translated webpages in accordance with some embodiments. At block 705, during a build time, a developer device generates one or more resource files that define at least part of a webpage. For example, the one or more resource files can include HTML code for one or more webpages of a web site. The one or more resource files may include, for example, one or more definitions for content that may include or may be within a button, table, heading, title, caption, and/or text that are to appear on the webpage(s). In particular, the one or more resource files can include a plurality of strings. Each of at least some of the strings can identify content that is to be included in (or associated with) particular data objects. The resource file(s) can further specify relative locations of content and/or data objects. The resource file(s) may be generated based on (for example) receipt of input from a developer user and/or development software (e.g., integrated development environment).

At block 710, a content string is identified, at the developer device, from the resource file. In some instances, each content string conforming with a specified format is identified and iteratively (or concurrently) processed. The content string may be identified by determining that the content string is in a format indicating that it is translation ready. The content string can include particular content that is to be displayed in a webpage associated with the content string and being of the one or more webpages. The one or more resource files can indicate a location associated with the particular content relative to other content to be displayed in the webpage. The location can be indicated based on, for example, a location of the content string relative to other strings in the resource file(s), a defined table configuration, a defined frame configuration, a position associated with the content string in a document object model, etc.

At block 715, during a build time, a modified string is generated at the developer device. The modified string includes the content from the content string identified at block 710. The modified string also includes a file identifier and key information in the string. The key information can be unique relative to other key information associated with other content strings in the one or more resource files. In some instances, the content string includes a key-value pair, such as:

home.buttonText="Getting Started"

where the key is "home.buttonText" and the value is "Getting Started". The key information can include the key (i.e., "home.buttonText") that is already defined in the string. In some instances, the key information also includes the value. Generating the modified string can include, for example, embedding the file identifier and the key in the value of the key-value pair from the originally identified content string. The file identifier can include (for example) a name of a resource file and/or name of a webpage.

At block 720, the modified content string is transmitted from the developer device to a translation input device. In some instances, a resource file is updated to include the modified string, and the one or more resource files are transmitted to the translation input device. The transmission may be direct or (for example) via a web server or one or more other intermediate devices. At block 725, the modified content string is received at the translation input device.

At block 730, at a product run time, the modified content string is converted at the translation input device to a transformed string, and HTML attributes are added to the content string that correspond to the file identifier and key information. For example, the modified content string can be configured such that, when the one or more resource files are processed at a browser (e.g., by a browser plug-in) for webpage rendering, a format of the modified content string triggers the browser or other browser-related software (e.g., browser plug-in) to detect that the modified content string is to be processed in accordance with a defined protocol. The protocol can indicate that the modified content string is to be transformed to a transformed string that includes the particular content but lacks (e.g., does not include) the identifier of the resource file. Thus, the transformation can include (for example) removing parts of the modified string. In some instances, the transformed string lacks at least part of the key information embedded in the modified string. For example, if an initial string includes a key-value pair, and the modified string preserves the key-value pair and also embeds the key in the value (thereby including the key twice in the string), the transformation may include removing the key from the value.

At block 735, a presentation is generated at the translation input device using the HTML attributes. The presentation includes content from the original string. The presentation also includes an indication of a location of the content in the webpage. In some instances, the presentation includes a first portion that is configured to receive input identifying a translation for the content and a second portion that presents a screen shot of at least part of a webpage that includes the content. The presentation can identify a location of the content by, for example, including a shape, pointer, intensity emphasis near or at the part of the screen shot that is displaying the content. Alternatively or additionally, a document object model for the webpage can be displayed, and a portion of the model corresponding to the content can be highlighted, pointed to, differentially colored, etc.

At block 740, a translation of the content is identified. In some instances, block 740 includes receiving input that includes the translation via the first portion of the presentation. In some instances, a proposed translation is automatically generated and presented, and an input can accept, decline and/or replace the proposed translation via the first portion of the presentation.

At block 745, a translated version of the content string is identified at the translation input device. The translated version can include, for example, the key information and the translation of the content. The key information can indicate particularly what information is being translated and/or to which original string the translation corresponds. In some instances, upon identifying the translation of the content, a presented screen shot (e.g., in the second portion) can be updated to include the translation. For example, the transformed string can be identified using the key information, and the transformed string can be replaced with the translated version of the content string, such that the translation appears in the screen shot.

At block 750, the translation input device transmits the translated version of the content string to a web server. In some instances, this transmission is conditioned on a final approval of a translator user. In some instances, each of multiple translated versions of content strings (e.g., corresponding to all translatable content strings in a webpage or web site) are first generated, and the versions are then transmitted. In some instances, a new version of each of the one or more resource files are updated to include the translated version(s) of the content string(s), and the updated version(s) of the resource file(s) are transmitted to the web server.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
accessing one or more resource files that define one or more webpages of a web site;
identifying, from a resource file of the one or more resource files, a content string, the content string including particular content to be displayed at a particular portion of a webpage of the one or more webpages, the one or more resource files indicating a location associated with the particular content relative to other content to be displayed in the webpage, the webpage being associated with the content string;
defining a plurality of regions of a browser-specific rendering of the webpage based on the one or more resource files, the plurality of regions corresponding to a plurality of keys, each key of the plurality of keys indicating a corresponding region of the plurality of regions, wherein the browser-specific rendering of the webpage is generated by browser-related software;
identifying key information for the content string, the key information being represented by a key-value pair, a key of the key-value pair being included in the plurality of keys and identifying a data object of the content string and a value of the key-value pair including the particular content of the content string, the data object being associated with the particular portion of the webpage, and the key information being unique relative to other key information associated with other content strings in the one or more resource files, wherein the content string defines the key as a unique key, wherein the unique key indicates a single region of the plurality of regions that the content string is to be located on the browser-specific rendering of the webpage, wherein the single region indicated by the unique key is different than other regions indicated by other unique keys;
identifying (i) a format of the content string and (ii) content of a portion of the webpage adjacent to the content string, the content including additional content or graphics;
generating contextual data for the content string, the contextual data having the format of the content string and the content of the webpage adjacent to the content string, and the contextual data being indicative of where the particular content included in the content string is to be presented in the webpage;
generating a modified content string that includes the key information and that has the contextual data, wherein the browser-related software is configured to generate the browser-specific rendering of the webpage in response to executing the modified content string that includes the unique key;
updating the one or more resource files to include the modified content string; and
transmitting the one or more resource files to a receiving device.

2. The method as recited in claim 1, wherein generating the modified content string includes embedding the contextual data and the key in the value of the key-value pair, and wherein the key information that is unique relative to the other key information includes the key-value pair.

3. The method as recited in claim 1, wherein the modified content string has a configuration such that, when the one or more resource files are processed at a browser for webpage rendering, a format of the modified content string triggers the browser or other browser-related software to:

transform the modified content string to a transformed string, the transformed string including the particular content but lacking the contextual data; and
assign, to the transformed string, HTML attributes that include the contextual data and the key information, wherein the HTML attributes enable mapping the transformed string and a location of a rendered webpage.

4. The method as recited in claim 3, wherein the location includes a location within a screen shot of the rendered webpage or a location within a document object model corresponding to the rendered webpage.

5. The method as recited in claim 3, wherein the configuration of the modified content string includes one or more characteristics at a beginning or end of the modified content string that indicate that the browser or other browser-related software are to perform the transformation and assignment.

6. The method as recited in claim 1, wherein the content string corresponds to a button, title or heading on the one or more webpages.

7. The method as recited in claim 1, further comprising:
transforming the modified content string to a transformed string, the transformed string including the particular content and lacking the contextual data;
assigning, to the transformed string, HTML attributes that include the contextual data and the key information, wherein the HTML attributes enable mapping the transformed string and a location of the webpage;
generating a presentation that includes:
a first portion configured to receive input that identifies a translation of the particular content; and
a second portion that includes a rendering of at least part of the webpage, wherein the second portion further identifies where, within the rendering of the at least part of the webpage, the content is positioned based on the HTML attributes;
receiving, at the first portion, input that identifies the translation of the particular content;
generating a translated version of the content string, the translated version including the translation of the particular content and the key information; and
transmitting the translated version of the content string.

8. A computer-program product tangibly embodied in a non-transitory machine-readable medium, including instructions configured to cause one or more data processors to perform actions including:
accessing one or more resource files that define one or more webpages of a web site;
identifying, from a resource file of the one or more resource files, a content string, the content string including particular content to be displayed at a particular portion of a webpage of the one or more webpages, the one or more resource files indicating a location associated with the particular content relative to other content to be displayed in the webpage, the webpage being associated with the content string;
defining a plurality of regions of a browser-specific rendering of the webpage based on the one or more resource files, the plurality of regions corresponding to a plurality of keys, each key of the plurality of keys indicating a corresponding region of the plurality of regions, wherein the browser-specific rendering of the webpage is generated by browser-related software;
identifying key information for the content string, the key information being represented by a key-value pair, a key of the key-value pair being included in the plurality of keys and identifying a data object of the content string and a value of the key-value pair including the particular content of the content string, the data object being associated with the particular portion of the webpage, and the key information being unique relative to other key information associated with other content strings in the one or more resource files, wherein the content string defines the key as a unique key, wherein the unique key indicates a single region of the plurality of regions that the content string is to be located on the browser-specific rendering of the webpage, wherein the single region indicated by the unique key is different than other regions indicated by other unique keys;

identifying (i) a format of the content string and (ii) content of a portion of the webpage adjacent to the content string, the content including additional content or graphics;

generating contextual data for the content string, the contextual data having the format of the content string and the content of the webpage adjacent to the content string, and the contextual data being indicative of where the particular content included in the content string is to be presented in the webpage;

generating a modified content string that includes the key information and that has the contextual data, wherein the browser-related software is configured to generate the browser-specific rendering of the webpage in response to executing the modified content string that includes the unique key;

updating the one or more resource files to include the modified content string; and transmitting the one or more resource files to a receiving device.

9. The computer-program product as recited in claim 8, wherein generating the modified content string includes embedding the contextual data and the key in the value of the key-value pair, and wherein the key information that is unique relative to the other key information includes the key-value pair.

10. The computer-program product as recited in claim 8, wherein the modified content string has a configuration such that, when the one or more resource files are processed at a browser for webpage rendering, a format of the modified content string triggers the browser or other browser-related software to:

transform the modified content string to a transformed string, the transformed string including the particular content but lacking the contextual data; and assign, to the transformed string, HTML attributes that include the contextual data and the key information, wherein the HTML attributes enable mapping the transformed string and a location of a rendered webpage.

11. The computer-program product as recited in claim 10, wherein the location includes a location within a screen shot of the rendered webpage or a location within a document object model corresponding to the rendered webpage.

12. The computer-program product as recited in claim 10, wherein the configuration of the modified content string includes one or more characteristics at a beginning or end of the modified content string that indicate that the browser or other browser-related software are to perform the transformation and assignment.

13. The computer-program product as recited in claim 8, wherein the content string corresponds to a button, title or heading on the one or more webpages.

14. A system comprising:
one or more processors; and
a non-transitory machine-readable medium containing instructions which when executed on the one or more processors, cause the one or more processors to perform actions including:

accessing one or more resource files that define one or more webpages of a web site;

identifying, from a resource file of the one or more resource files, a content string, the content string including particular content to be displayed at a particular portion of a webpage of the one or more webpages, the one or more resource files indicating a location associated with the particular content relative to other content to be displayed in the webpage, the webpage being associated with the content string;

defining a plurality of regions of a browser-specific rendering of the webpage based on the one or more resource files, the plurality of regions corresponding to a plurality of keys, each key of the plurality of keys indicating a corresponding region of the plurality of regions, wherein the browser-specific rendering of the webpage is generated by browser-related software;

identifying key information for the content string, the key information being represented by a key-value pair, a key of the key-value pair being included in the plurality of keys and identifying a data object of the content string and a value of the key-value pair including the particular content of the content string, the data object being associated with the particular portion of the webpage, and the key information being unique relative to other key information associated with other content strings in the one or more resource files, wherein the content string defines the key as a unique key, wherein the unique key indicates a single region of the plurality of regions that the content string is to be located on the browser-specific rendering of the webpage, wherein the single region indicated by the unique key is different than other regions indicated by other unique keys;

identifying (i) a format of the content string and (ii) content of a portion of the webpage adjacent to the content string, the content including additional content or graphics;

generating contextual data for the content string, the contextual data having the format of the content string and the content of the webpage adjacent to the content string, and the contextual data being indicative of where the particular content included in the content string is to be presented in the webpage;

generating a modified content string that includes the key information and that has the contextual data, wherein the browser-related software is configured to generate the browser-specific rendering of the webpage in response to executing the modified content string that includes the unique key;

updating the one or more resource files to include the modified content string; and transmitting the one or more resource files to a receiving device.

15. The system as recited in claim 14, wherein generating the modified content string includes embedding the contextual data and the key in the value of the key-value pair, and wherein the key information that is unique relative to the other key information includes the key-value pair.

16. The system as recited in claim 14, wherein the modified content string has a configuration such that, when the one or more resource files are processed at a browser for webpage rendering, a format of the modified content string triggers the browser or other browser-related software to:
   transform the modified content string to a transformed string, the transformed string including the particular content but lacking the contextual data; and
   assign, to the transformed string, HTML attributes that include the contextual data and the key information, wherein the HTML attributes enable mapping the transformed string and a location of a rendered webpage.

17. The system as recited in claim 16, wherein the location includes a location within a screen shot of the rendered webpage or a location within a document object model corresponding to the rendered webpage.

18. The system as recited in claim 16, wherein the configuration of the modified content string includes one or more characteristics at a beginning or end of the modified content string that indicate that the browser or other browser-related software are to perform the transformation and assignment.

19. The system as recited in claim 14, wherein the content string corresponds to a button, title or heading on the one or more webpages.

20. The system as recited in claim 14, transforming the modified content string to a transformed string, the transformed string including the particular content and lacking the contextual data;
   assigning, to the transformed string, HTML attributes that include the contextual data and the key information, wherein the HTML attributes enable mapping the transformed string and a location of the webpage;
   generating a presentation that includes:
      a first portion configured to receive input that identifies a translation of the particular content; and
      a second portion that includes a rendering of at least part of the webpage, wherein the second portion further identifies where, within the rendering of the at least part of the webpage, the content is positioned based on the HTML attributes;
   receiving, at the first portion, input that identifies the translation of the particular content;
   generating a translated version of the content string, the translated version including the translation of the particular content and the key information; and
   transmitting the translated version of the content string.

* * * * *